US012736387B2

(12) United States Patent
Inglund et al.

(10) Patent No.: US 12,736,387 B2
(45) Date of Patent: Sep. 15, 2026

(54) FIELD DEVICE SYSTEM AND METHOD OF CONFIGURING A FIELD DEVICE SYSTEM

(71) Applicant: Rosemount Tank Radar AB, Mölnlycke (SE)

(72) Inventors: Mikael Inglund, Stora Höga (SE); Morgan Mårdeland, Gothenburg (SE); Roberth Asplund, Gothenburg (SE); Daniel Johansson, Mölnlycke (SE)

(73) Assignee: Rosemount Tank Radar AB, Mölnlycke (SE)

(*) Notice: Subject to any disclaimer, the term of this patent is extended or adjusted under 35 U.S.C. 154(b) by 273 days.

(21) Appl. No.: 18/409,895

(22) Filed: Jan. 11, 2024

(65) Prior Publication Data

US 2024/0247964 A1 Jul. 25, 2024

(30) Foreign Application Priority Data

Jan. 25, 2023 (EP) .................................... 23153217

(51) Int. Cl.

*G01F 23/284* (2006.01)
*H01Q 1/22* (2006.01)
*H04W 4/80* (2018.01)

(52) U.S. Cl.

CPC ........... *G01F 23/284* (2013.01); *H01Q 1/225* (2013.01); *H04W 4/80* (2018.02)

(58) Field of Classification Search

CPC ........ G01F 23/284; H04W 4/80; H01Q 1/225
See application file for complete search history.

(56) References Cited

U.S. PATENT DOCUMENTS 10,274,350 B2 4/2019 Mudireddy et al.
2007/0229229 A1* 10/2007 Nelson .................. G01D 21/00 340/870.11

(Continued)

FOREIGN PATENT DOCUMENTS

DE 102010040865 A1 3/2012
DE 102019134197 A1 * 6/2021 ............ G01D 9/005

(Continued)

OTHER PUBLICATIONS

Extended Search Report from European Patent Application No. 23153217.7, dated Jun. 30, 2023.

*Primary Examiner* — Nazra Nur Waheed
(74) *Attorney, Agent, or Firm* — Westman, Champlin & Koehler, P.A.

(57) ABSTRACT

A field device system configured to determine a process variable, the field device system comprising: a housing, the housing comprising a first NFC-circuit configured to receive and store information; a sensor module comprising a sensor and a second NFC-circuit configured to store configuration information of the sensor, the sensor module being configured to acquire a sensing signal indicative of a process variable value; and an electronics module arranged in the housing and comprising sensing circuitry configured to communicate with the sensor module to receive the sensing signal from the sensor module, the electronics module comprising a third NFC-circuit configured to read configuration information of the sensor module from the second NFC-circuit and to write configuration information of the sensor module and configuration information of the electronics module to the first NFC-circuit.

15 Claims, 5 Drawing Sheets

(56) References Cited

U.S. PATENT DOCUMENTS

| | | | | |
|---|---|---|---|---|
| 2016/0299478 | A1* | 10/2016 | Junk | G05B 15/02 |
| 2023/0273064 | A1 | 8/2023 | Karweck et al. | |
| 2024/0102689 | A1* | 3/2024 | Grogg | F24F 13/1426 |

FOREIGN PATENT DOCUMENTS

| | | | | |
|---|---|---|---|---|
| DE | 102020113170 | A1 | 11/2021 | |
| DE | 102020209903 | A1 | 2/2022 | |
| DE | 102020124299 | A1 * | 3/2022 | G01S 15/88 |
| WO | 2022037762 | A1 | 2/2022 | |

* cited by examiner

FIELD DEVICE SYSTEM AND METHOD OF CONFIGURING A FIELD DEVICE SYSTEM

CROSS-REFERENCE TO RELATED APPLICATION

This application claims priority to European Patent Application No. 23153217.7, filed Jan. 25, 2023, the content of which is hereby incorporated by reference in its entirety.

FIELD OF THE INVENTION

The present invention relates to a field device system and to a method for storing configuration information in a field device system. In particular, the present invention is aimed at a field device system comprising a plurality of NFC-circuits configured to store configuration information of modules of the field device system.

BACKGROUND OF THE INVENTION

Field devices are often used in industry to measure various process variables, such as pressure, temperature, flow or product level. In particular, a radar level gauge system is an example of a field device which may be used for measuring the level of a product such as a process fluid, a granular compound or another material.

Radar level gauge (RLG) systems are for example in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

The transmitted electromagnetic signals are reflected at the surface of the product, and the reflected signals are received by a receiver or transceiver comprised in the radar level gauge. Based on the transmitted and reflected signals, the distance to the surface of the product can be determined. More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Field devices in general and radar level gauge systems in particular are many times used in hazardous environments and in areas specifically classified as hazardous areas according to existing industry standards. In such applications, replacement and maintenance of the system can be both complicated and dangerous. For example, radar level gauge systems used in the petroleum industry typically need to be Ex-rated which in turn puts limitations on service and maintenance of the system.

Accordingly, there is a need to simplify the installation, service and maintenance of radar level gauge systems.

SUMMARY

In view of above-mentioned problems, it is an object of the present invention to provide a system and method simplifying the replacement of a component in a field device.

According to a first aspect of the invention, there is provided a field device system configured to determine a process variable, the field device system comprising: a housing, the housing comprising a first NFC-circuit configured to receive and store information; a sensor module comprising a sensor and a second NFC-circuit configured to store configuration information of the sensor, the sensor module being configured to acquire a sensing signal indicative of a process variable value; and an electronics module arranged in the housing and comprising sensing circuitry configured to communicate with the sensor module to receive the sensing signal from the sensor module, the electronics module comprising a third NFC-circuit configured to read configuration information of the sensor module from the second NFC-circuit and to write configuration information of the sensor module and configuration information of the electronics module to the first NFC-circuit.

A field device should be understood to include any device that determines a process variable and communicates a measurement signal indicative of that process variable to a remote location. Examples of field devices include devices for determining process variables such as filling level, temperature, pressure, fluid flow etc.

Moreover, the sensor module should be seen as including both the active sensing device as such as well as any required housing or accessory suitable for a particular application.

The present invention is based on the realization that the replacement of components in a field device system can be greatly simplified by providing the housing, sensor module and electronics module with respective NFC-circuits for storing configuration information. In particular, the housing is often fixed to a tank, container, pipe or the like where the measurement are to be performed and the housing is also less likely to be replaced or serviced compared to the sensor module and the electronics module. It is therefore advantageous to store configuration information of the sensor module and the electronics module in the NFC-circuit of the housing so that if a sensor module or electronics module is to be replaced, the required and up-to-date configuration is already stored in the housing where it can be read by the new module. Installation of a new electronics or sensor module is thereby greatly simplified By means of the described system, there is also a reduced risk of installing a component using incorrect configuration settings since the new module can simply use the latest stored settings used by the previous module.

The described system is also advantageous in a new installation of the field device system as a whole since information of the respective modules can be pre-stored in the NFC circuitry and once the system is installed, the electronics module can read the correct settings directly from the NFC circuitry of the housing and sensor module.

Furthermore, the electronics module can for example be configured to store settings and other required configuration information in the first NFC-circuit of the housing intermittently, after each successful measurement or when settings have changed, thereby ensuring that correct information is present in the first NFC-circuit to be used if the electronics module or sensor module needs to be replaced.

According to one embodiment of the invention, the first NFC-circuit is a passive NFC-circuit requiring wireless power transfer for storing and transmitting information. Moreover, the second NFC-circuit may also be a passive NFC-circuit requiring wireless power transfer for storing and transmitting information. This means that there is no need for a permanent or individual power supply to either of the housing or the sensor module which simplifies the system as a whole and which may also lead to reduced power consumption.

According to one embodiment of the invention, the third NFC-circuit is an active NFC-circuit configured to receive power from an external power source to write and read information to and from the first and second NFC-circuits. The external power source can for example be a battery connected to the electronics module, or the electronics module and/or the third NFC-circuit can comprise wired grid connection for providing power. The third NFC-circuit can thereby act as an active NFC-reader where power is provided wirelessly to first and second NFC-circuits. In the same manner, the third NFC-circuit can write information to the first and second NFC-circuits. It should be noted that it would also be possible to provide a system where one or both of the first and second NFC-circuits has its own power supply.

According to one embodiment of the invention, the housing is configured to be connected to a container. In applications where the housing is connected to container it can be assumed that the housing needs to be replaced or removed for other reasons less often than the sensor module and electronics module, in which case it is particularly advantageous to have configuration information of the sensor module and electronics module stored in the NFC-circuit of the housing.

According to one embodiment of the invention, the field device is a radar level gauge and wherein the sensor module comprises an antenna of the radar level gauge. Thereby, the second NFC-circuit advantageously comprises pre-stored information describing features of the antenna.

According to a second aspect of the invention, there is provided a method of configuring a field device system for determining a process variable, the system comprising a housing comprising a first NFC-circuit configured receive and store information; a sensor module comprising a sensor and a second NFC-circuit configured to store configuration information of the sensor, the sensor module being configured to acquire a sensing signal indicative of a process variable value; and an electronics module comprising sensing circuitry configured to communicate with the sensor module to receive the sensing signal from the sensor module, the electronics module comprising a third NFC-circuit. The method comprises: by the third NFC-circuit, reading configuration information of the sensor module from the second NFC-circuit; and reading configuration information of the housing from the first NFC-circuit.

By means of the described method, an electronics module can read configuration information of the sensor module and of the housing directly without having to be pre-configured. This is advantageous for example when the electronics module is replaced or if it needs to be restarted and reset since there is no need to manually provide the required configuration of the associated housing and sensor module to the electronics module.

According to one embodiment of the invention the method further comprises: by the third NFC-circuit, writing the configuration information of the sensor module to the first NFC-circuit of the housing module; and writing configuration information of the electronics module to the first NFC-circuit of the housing module. The configuration information is thereby stored at the place of the field device system.

The method may also comprise writing configuration information of the electronics module to the housing so that all required information for operating the field device system is available in the housing.

According to one embodiment of the invention, the method further comprises, during a system initiation procedure: by the third NFC-circuit, reading stored configuration information of the sensor module and of the electronics module from the first NFC-circuit; by the electronics module, communicating with a remote host a predetermined number of times; and receiving confirmation from host that the configuration of the electronics module is correct before writing configuration information of the electronics module to the first NFC-circuit.

The field device evaluates the updated configuration and if the information is confirmed to be valid, the information can be stored in the first NFC-circuit. If the updated configuration is invalid, a configuration warning message can be generated with the option to revert to the configuration previously stored in the in the first NFC-circuit.

There is also provided a computer program product comprising program code for performing, when executed by a processor device, the method of any of the aforementioned embodiments, a control system comprising one or more control units configured to perform the method and a non-transitory computer-readable storage medium comprising instructions, which when executed by the processor device, cause the processor device to perform the method of any of the aforementioned embodiments.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a field device in the form of a radar level gauge installed in a tank. However, the described system and method is suitable for any type of field device comprising a housing, a sensor module and an electronics module.

Figure 1:
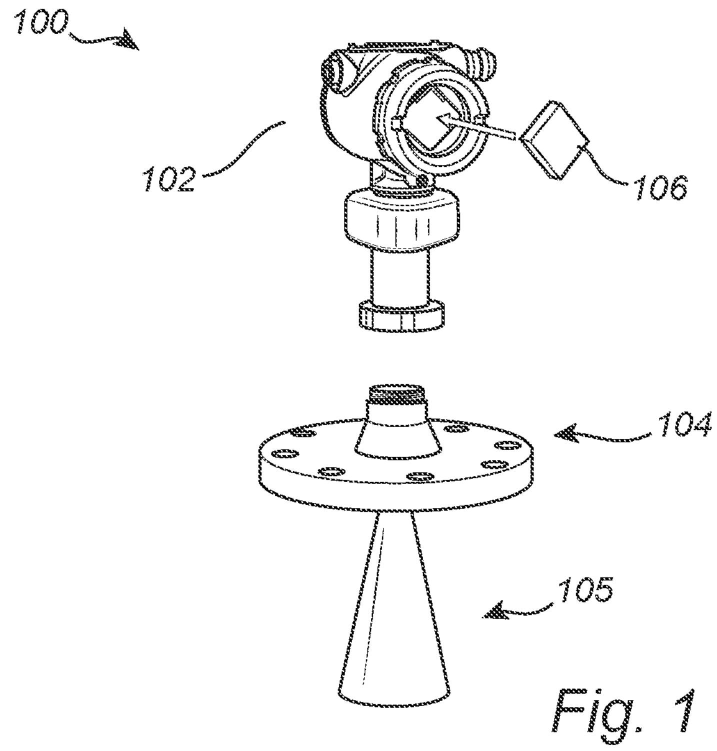
FIG. 1 schematically illustrates an exemplary field device system in the form of a radar level gauge system.

FIG. 1 schematically illustrates an example embodiment of the present invention comprising a field device system 100 in configured to determine a process variable where the field device system is represented by a radar level gauge system suitable for arrangement on a tank. The radar level gauge system 100 is typically configured to determine a fill level of a product in a tank.

The field device system 100 comprises a housing 102, a sensor module 104 comprising a sensor 105, and an electronics module 106 arranged in the housing 102 and comprising sensing circuitry configured to communicate with the sensor module 104 to receive the sensing signal from the sensor module 104. In the present example, the sensor module 104 is represented by an antenna module and the sensor 105 is the antenna as such. However, various embodiments of the present invention are applicable for a wide range of field devices comprising sensors and sensor modules such as pressure sensors, flow sensors, temperatures sensors, viscosity sensors or the like. In general, field devices can be seen to encompass any remotely controlled devices used in process control and automation.

Figure 2:
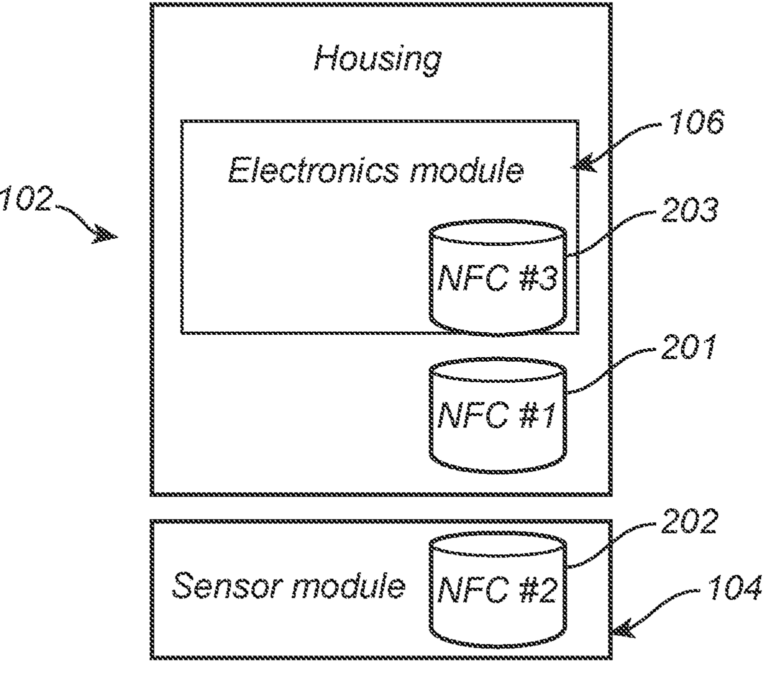
FIG. 2 is a schematic block diagram of a field device system according to an embodiment of the invention.

FIG. 2 is a block diagram schematically illustrating components of the field device system 100. In particular, FIG. 2 it further illustrates the housing 102 comprising a first NFC-circuit 201 configured to receive and store information, the sensor module 104 comprising a second NFC-circuit 202 configured to store configuration information of the sensor 105, the sensor module 104 being configured to acquire a sensing signal indicative of a process variable value, and an electronics module 106 arranged in the housing 102. The electronics module 106 comprises sensing circuitry configured to communicate with the sensor module 104 to receive the sensing signal from the sensor module 104.

The electronics module 106 comprises a third NFC-circuit 203 configured to read configuration information of the sensor module 104 from the second NFC-circuit 202 located in the sensor module and to write configuration information of the sensor module 104 and configuration information of the electronics module 106 to the first NFC-circuit 201 located in the housing 102. In addition to the illustrated modules, it would also be possible to add further NFC-enabled components such as a display or the like, where configuration of information of such additional components could be stored either in the housing 102 or in another module of the field device system 100.

Figure 3:
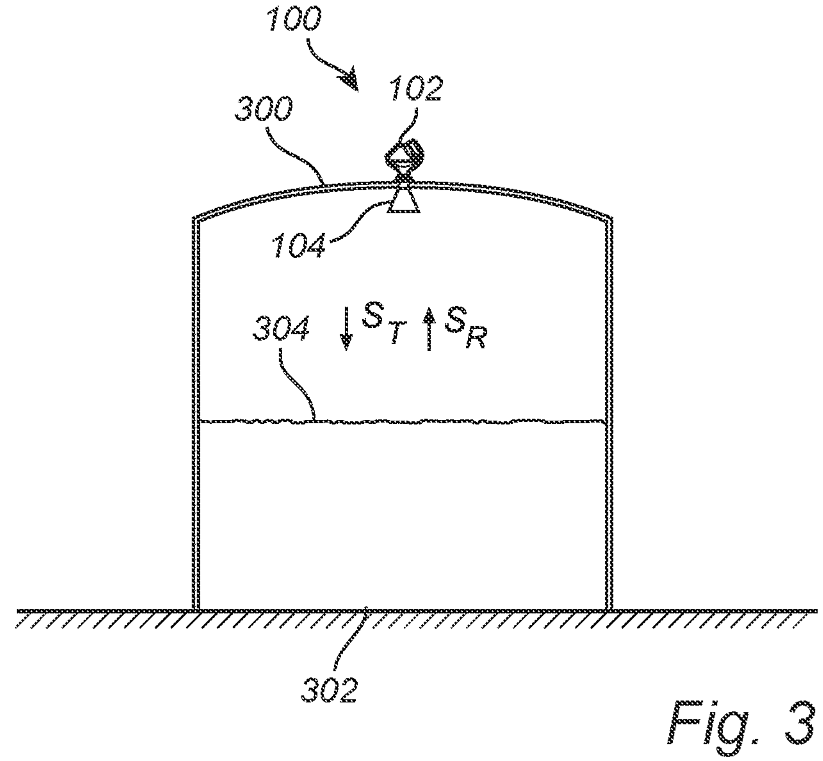
FIG. 3 schematically illustrates an exemplary tank arrangement comprising a radar level gauge system according to an embodiment of the present invention.

FIG. 3 schematically illustrates an example implementation of a field device system 100 comprising a housing 102 in which an electronics module is arranged, and a signal propagation device here shown in the form of a horn antenna 104. It should, however, be noted that the signal propagation device may equally well be another type of radiating antenna, or a transmission line probe. Moreover, the housing 102 and the sensor module 104 may be integrated in one physical unit.

The radar level gauge system 100 is arranged on top of a tank 300 for determining the filling level of a product 302 in the tank 300. When measuring the filling level of the product 302 in the tank 300, the radar level gauge system 100 transmits an electromagnetic transmit signal ST by the horn antenna 104 towards the surface 304 of the product 302, where the signal is reflected as an electromagnetic surface echo signal SR. The distance to the surface 304 of the product 302 is then determined based on the travel time of the electromagnetic surface echo signal SR (from the radar level gauge system 100 to the surface 304 and back). From the travel time, the distance to the surface, generally referred to as ullage, can be determined. Based on this distance (the ullage) and known dimensions of the tank 300, the filling level can be deduced.

Using the radar level gauge system 100 according to various embodiments of the present invention, the travel time is determined based on the frequency difference between the frequency-modulated transmit signal and the surface reflection signal. This type of measurement scheme is often referred to as FMCW (Frequency Modulated Continuous Wave), and a measurement signal can be described as a signal sweep having limited and known duration.

Figure 4:
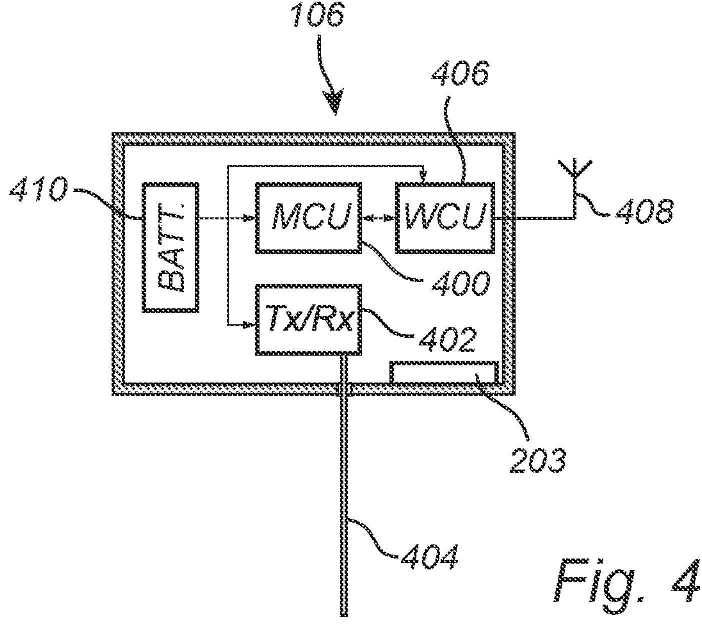
FIG. 4 is a schematic block diagram of an electronics module of a radar level gauge system according to an embodiment of the invention.

FIG. 4 schematically illustrates an electronics module 106 comprising circuitry for performing measurements in a radar level gauge system 100. It should however be noted that the circuitry required for operating a field device may vary significantly between different types of field devices, and that the following description serves as an example illustrating the principle of a radar level gauge system. Various embodiment of the claimed invention relating to the use of NFC-circuits in different parts of a field device system can be understood by the skilled person based on the following descriptive examples.

As is schematically illustrated in FIG. 4, the electronics module 106 comprises a measurement control unit (MCU) 400 which controls a transceiver (Tx/Rx) 402 to generate, transmit and receive electromagnetic signals (ST). The transmitted signals pass through the tank feed-through 404 to the horn antenna 104 (not shown in FIG. 4), and the received signals (SR) pass from the horn antenna 104 through the tank feed-through 404 to the transceiver 402.

The filling level is provided to an external device, such as a control center from the MCU 400 via a wireless control unit (WCU) 406 through a communication antenna 408. The radar level gauge system 100 may advantageously be configured according to the so-called WirelessHART communication protocol (IEC 62591).

Although the measurement unit 102 is shown to comprise an energy store 410 and to comprise devices (such as the WCU 406 and the communication antenna 408) for allowing wireless communication, it should be understood that power supply and communication may be provided in a different way, such as through communication lines (for example 4-20 mA lines, HART), in which case the WCU 406 may be replaced by a control unit for wired communication.

The control units and/or electronics module 106 described herein may include a microprocessor, microcontroller, programmable digital signal processor or another programmable processor device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Figure 5:
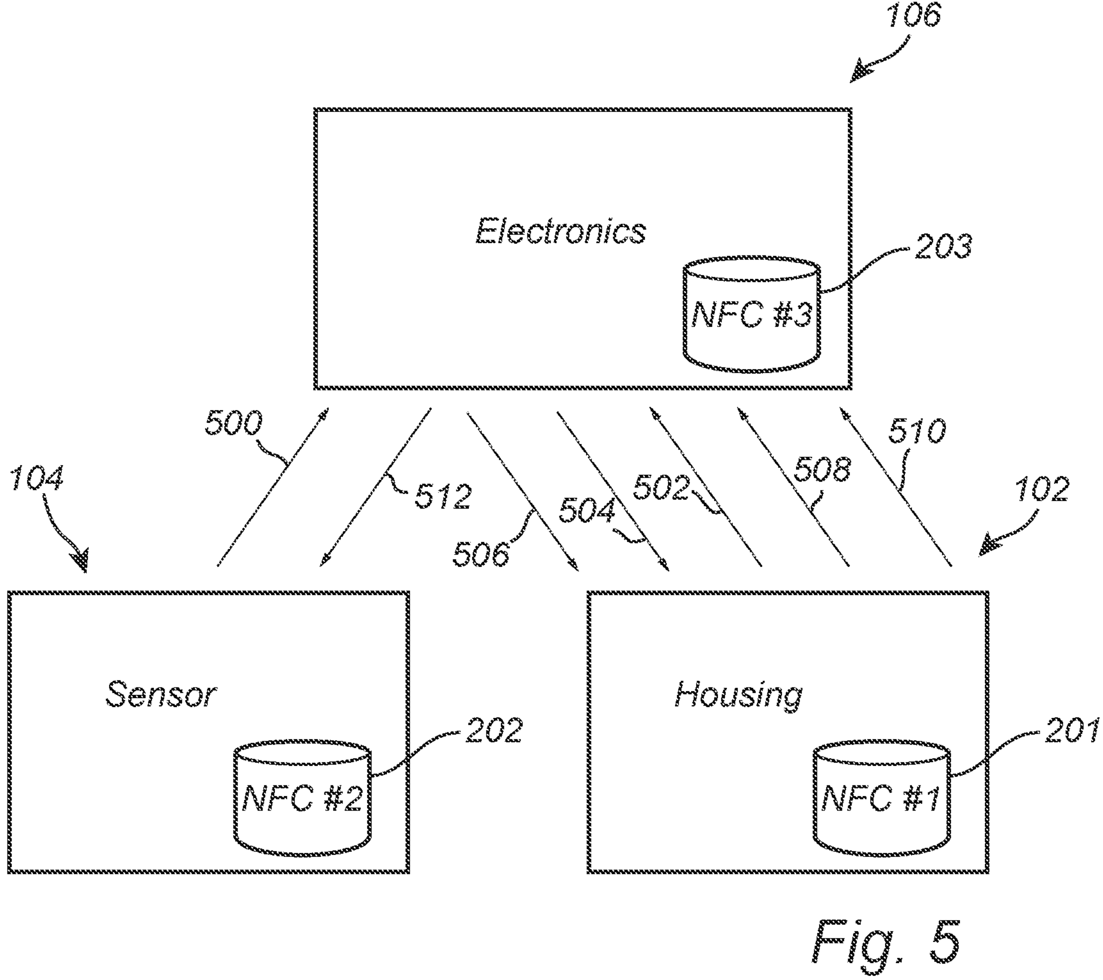
FIG. 5 is a schematic block diagram of a field device system illustrating communication between NFC-circuits of the components in the system according to embodiments of the invention.

FIG. 5 schematically illustrates different communication paths and information which can be transmitted between the housing 102, sensor module 104 and electronics module 106, each being provided with a respective NFC-circuit (201, 202, 203). At least the following information transfers are possible in the described field device system 100:

500—Reading configuration information of the sensor module from the sensor module.

502—Reading configuration information of the housing from the housing.

504—Writing configuration information of the sensor module to the housing.

506—Writing configuration information of the electronics module to the housing.

508—Reading configuration information of the sensor module from the housing.

510—Reading configuration information of the electronics module from the housing.

512—Writing configuration information of the sensor module to the sensor module.

In an example embodiment where the only active NFC-circuit is the third NFC-circuit 203 located in the electronics module 106, all read and write operations are initiated by the electronics module 106 where the third NFC-circuit 203 provides power to the first and second NFC-circuits 201, 202 as required. The electronics module 106 can thereby be seen as a primary unit and the housing 102 and sensing module 104 as secondary units in a primary/secondary unit configuration where the electronics module 106 controls measurements and communication of the field device system.

Based on the described field device system 100, various communication schemes are possible, and some examples will be described in the following with reference to the flow charts of FIGS. 6A-C. All the described read and write operations in the following examples are performed by the respective NFC-circuits 201, 202, 203 of the field device system 100.

Figure 6A:
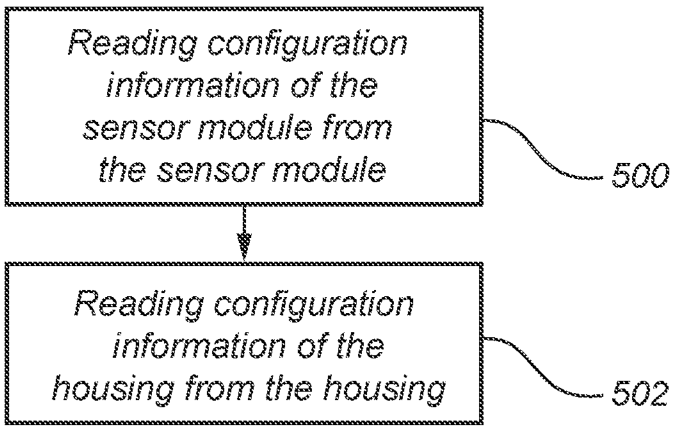
FIGS. 6A-C are flow charts outlining steps of methods according to example embodiments of the invention.

FIG. 6A describes a scenario which can be referred to as commissioning which for example is applicable when a new system is taken into use. The electronics module 106 reads 500 configuration information of the sensor module 104 from the sensor module 104 itself where the correct configuration information for a certain installation can be provided from the factory or stored during installation of the field device system. In a similar manner, the electronics module 106 reads 502 configuration information of the housing 102 from the housing 102.

Figure 6B:
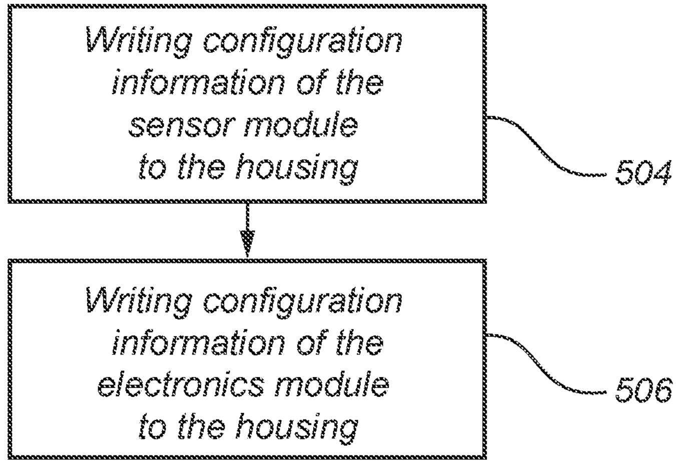

FIG. 6B describes writing 504 configuration information of the sensor module 104 to the housing 102 and writing 506 configuration information of the electronics module 106 to the housing 102. Here, all configuration information is stored in the housing 102 for example in preparation of replacement of the electronics module 106 and/or of the sensor module 104. The housing 102 can thereby have all of the required settings stored for operating the field device system so that if the electronics module 106 and/or of the sensor module 104 is replaced, configuration information can be automatically read directly from the housing without having to provide settings manually. This both simplifies installation of a new module and also reduces the risk of using erroneous settings.

Figure 6C:
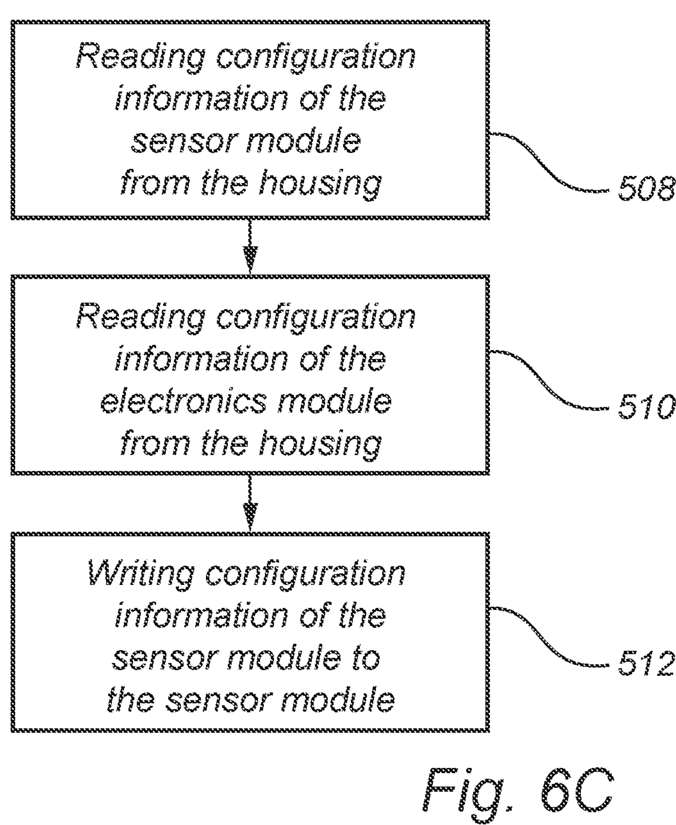

FIG. 6C describes a scenario including reading 508 configuration information of the sensor module 104 from the housing 102, reading 510 configuration information of the electronics module 106 from the housing and writing 512 configuration information of the sensor module 104 to the sensor module 104.

Figure 7:
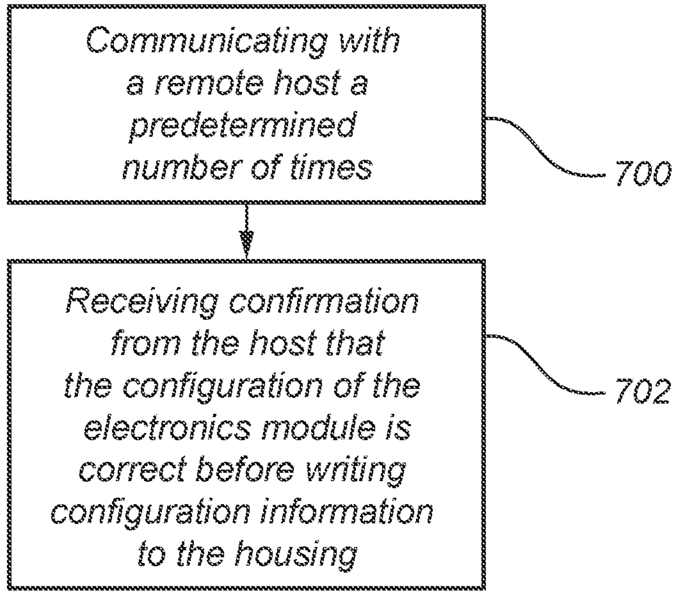
FIG. 7 is a flow chart outlining steps of a method according to an example embodiment of the invention.

To ensure that a read or write operation is performed without error, checksums included in the NFC-protocol can advantageously be used. Accordingly, it is preferable that the field device is capable of determining that configuration information is correctly transferred and that a configuration is valid without external communication with a host or the like. However, in some embodiments it is desirable to further ensure not only that the configuration information is correctly transferred, but also that the used configuration information results in correct operation of the field device system 100 as a whole. Correct operation can be ensured by a method of operating the field device system 100 according to an embodiment of the invention outlined in FIG. 7.

The method comprises, by the electronics module 106, communicating 700 with a remote host a predetermined number of times and receiving 702 confirmation from the remote host that the configuration of the electronics module 106 is correct before writing 504 configuration information of the electronics module 106 to the first NFC-circuit 201 of the housing. By awaiting a confirmation from the remote host, it can be ensured that correct configuration information is stored in the housing. However, that communication with the host is possible may act as confirmation as such, and if a predetermined number of communications with the host is performed, it can be determined that the configuration information is correct without getting an active confirmation from the host. A person skilled in the art will also understand that the configuration data preferably is stored in a format such that the integrity of the data can be ensured, e.g. using checksums and/or encryption technology.

In some embodiments, a primary complete record of the configuration information of the field device is stored in the non-volatile memory of the electronics unit. A secondary record is stored in a non-volatile memory physically allocated in the hardware to which the configuration applies, or in a non-volatile memory that is detachable from the hardware such that it can be detected and read from the electronics unit. The secondary memory holds, at least, the latest valid configuration. There is at least two such distinct secondary records; one in the housing of the Field Device, and one belonging to the sensor of the Field Device. This enables two modes of updating a configuration in the complete field device;

1) The end user directly manipulates the primary record via memory write commands sent from the host system to the field device, and stored by the electronics unit in the primary record. Once the new configuration is evaluated as valid by the device the secondary record is updated to match the primary.

2) The end user replaces a physical part of the field device and upon first power on and/or system (re-)initiation the configuration from the new spare part is compared with the existing record from the replaced part.

2a) If the electronics unit is replaced, then the complete copy of the previous electronics unit's primary memory is read from the secondary memory in the Housing, which includes information about the sensor and the tank environment, to create a clone configuration in the new electronics such that it will work seamlessly with the host as if the old part was still functional. Once the new configuration is evaluated as valid by the device the secondary Record in the Housing is updated to match the primary.

2b) If the sensor part is replaced, the electronics will detect if the new sensor unit has an updated configuration, and then update its primary memory to match the new sensor configuration information, effectively automatically adapting to the new sensor.

Once the new configuration is evaluated as valid by the device the secondary record in the Housing is updated to match the primary. Note, specifically in both 2*a* and 2*b* this includes backwards compatibility if the new spare part is of a newer revision than the part it replaced, keeping the same behavior even if the complete configuration information needed in the updated system is different.

Additionally, the physical allocation of memory in separate hardware allows redundancy by storing the complete configuration in such a way that it can be fully restored even if one of the allocated memories is removed. A person skilled in the art will understand that the configuration is stored in such a way that unintentional changes, e.g. from a corrupt eeprom, will not be detected as updated configuration, for example by using checksums. Likewise, there is no need to transfer any configuration information if the primary and secondary records match, also easily deduced by the use of said checksums. Lastly, without imposing restrictions on the architecture as such, a supervising data scheme may be used to control the flow of data between primary and secondary to allow specific events to be handled as special cases, e.g. a complete reset of the primary memory to a default state may defer the update of the secondary records until completion of a setup wizard in the Host.

For example, in one embodiment representing a Radar Level Gauge, the sensor information could include antenna gain, the effective antenna internal electrical length, a calibrated snapshot of the antenna RF characteristics as function of both frequency and time/distance. In the same manner, the information stored in the Housing can be pertinent to the installation and process conditions, for example the geometry of the tank, the configuration of filling levels that represents high or high-high conditions to trigger specific alarm states, expected process conditions such as the medium in the tank, maximum filling rates, or presence of foam.

The present invention thus relates to the above described functionality enabled by a plurality of NFC-circuits, where the primary record is connected to an active NFC circuit and the secondary records are passive NFC tags.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A field device system configured to determine a process variable, the field device system comprising:

a housing, the housing comprising a first NFC-circuit configured to receive and store information;

a sensor module comprising a sensor and a second NFC-circuit configured to store configuration information of the sensor, the sensor module being configured to acquire a sensing signal indicative of a process variable value; and an electronics module arranged in the housing and comprising sensing circuitry configured to communicate with the sensor module to receive the sensing signal from the sensor module, the electronics module comprising a third NFC-circuit configured to read configuration information of the sensor module from the second NFC-circuit and to write configuration information of the sensor module and configuration information of the electronics module to the first NFC-circuit.

2. The field device system according to claim 1, wherein the first NFC-circuit is a passive NFC-circuit requiring wireless power transfer for storing and transmitting information.

3. The field device system according to claim 1, wherein the second NFC-circuit is a passive NFC-circuit requiring wireless power transfer for storing and transmitting information.

4. The field device system according to claim 1, wherein the third NFC-circuit is an active NFC-circuit configured to receive power from an external power source to write and read information to and from the first and second NFC-circuits.

5. The field device system according to claim 1, wherein the housing is configured to be connected to a container.

6. The field device system according to claim 1, wherein the field device is a radar level gauge and wherein the sensor module comprises an antenna of the radar level gauge.

7. The field device system according to claim 6, wherein the second NFC-circuit comprises pre-stored information describing features of the antenna.

8. Method of configuring a field device system for determining a process variable, the system comprising a housing comprising a first NFC-circuit configured to receive and store information; a sensor module comprising a sensor and a second NFC-circuit configured to store configuration information of the sensor, the sensor module being configured to acquire a sensing signal indicative of a process variable value; and an electronics module comprising sensing circuitry configured to communicate with the sensor module to receive the sensing signal from the sensor module, the electronics module comprising a third NFC-circuit, the method comprising: by the third NFC-circuit of the electronics module, reading configuration information of the sensor module from the second NFC-circuit of the sensor module; and reading configuration information of the housing from the first NFC-circuit of the housing.

9. The method according to claim 8, further comprising:

by the third NFC-circuit, writing the configuration information of the sensor module to the first NFC-circuit of the housing module; and writing configuration information of the electronics module to the first NFC-circuit of the housing module.

10. The method according to claim 8, wherein the first NFC-circuit is a passive NFC-circuit requiring external power for storing and transmitting information.

11. The method according to claim 8, wherein the second NFC-circuit is a passive NFC-circuit requiring external power for storing and transmitting information.

12. The method according to claim 8, further comprising, during a system initiation procedure: by the third NFC-circuit, reading stored configuration information of the sensor module and of the electronics module from the first NFC-circuit of the housing; by the electronics module, communicating with a remote host a predetermined number of times; and receiving confirmation from host that stored configuration of the electronics module is correct before writing configuration information of the electronics module to the first NFC-circuit of the housing.

13. The method according to claim 8, further comprising:

by the third NFC-circuit, reading stored configuration information of the sensor module from the first NFC-circuit of the housing; and writing configuration information of the sensor module to the second NFC-circuit of the sensor module.

14. A non-transitory computer program product comprising program code for performing, when executed by a processor device, the method of claim 8.

15. A non-transitory computer-readable storage medium comprising instructions, which when executed by a processor device, cause the processor device to perform the method of claim 8.

* * * * *